H R. FRONING
INVENTOR.

BY *Arthur McIlray*
ATTORNEY

H R. FRONING
INVENTOR.

United States Patent Office 3,438,439
Patented Apr. 15, 1969

3,438,439
METHOD FOR PLUGGING FORMATIONS BY PRODUCTION OF SULFUR THEREIN
H Robert Froning, Tulsa, Okla., assignor to Pan American Petroleum Corporation, Tulsa, Okla., a corporation of Delaware
Filed May 29, 1967, Ser. No. 642,034
Int. Cl. E21b *33/138, 43/25*
U.S. Cl. 166—292
11 Claims

ABSTRACT OF THE DISCLOSURE

When oil—which is in contact with the gas zone—is produced, the gas has a tendency to cone resulting in high gas-oil ratios. Where oil and gas are found in rather sharply dipped structures, it is desired to prevent the flow of oil up-dip into the gas cap during secondary recovery operations. Also, in such operations, the gas cap itself requires considerable compression before the system will respond effectively. To prevent coning and in order to prevent uncontrollable migration of the oil and/or gas, this invention provides a means of segregating these two fluids. Specifically, this object is accomplished by forming a sulfur barrier or plug at the gas-oil interface by reacting sulfur dioxide with hydrogen sulfide in the presence of moisture. This process is most advantageously employed in situations where the gas gap involved contains hydrogen sulfide although both of these gases can be injected from the surface into the oil gas interface to form the sulfur barrier.

The present invention relates to a novel method for forming a barrier or plug in a hydrocarbon-containing reservoir. More particularly, it is concerned with a method for preventing gas coning as well as uncontrolled migration of reservoir or injected fluids by the formation of elemental sulfur at a desired location in the formation.

Background of invention

The need for an effective method of placement of a plugging material in a reservoir often occurs where it is desired to recover oil underlying a gas cap of substantial size. In some cases, particularly where the oil and gas are found in rather sharply dipped structures, it is desired to prevent the flow of oil updip into the gas cap during waterflooding operations. Also, in such secondary recovery operations the gas cap itself requires considerable compression before the system will respond effectively to waterflooding. Accordingly, in either of these a means of segregating the oil from the gas is frequently necessary for the oil to be recovered economically.

A second condition in which a plugging operation is helpful is where gas coning is encountered. Here the gas has a downward force component sufficiently great to move the oil away from the well, forming a cusp shaped configuration of gas adjacent to the well and in most cases resulting in an excessive gas-oil ratio, often requiring shutting the well in.

Summary of invention

Briefly, my invention is based on the fact that free sulfur can be formed when hydrogen sulfide and sulfur dioxide contact one another in the presence of water. This reaction occurs readily at temperatures as low as about 70° F. Such phenomenon can be used to advantage in instances where gas coning is a problem or it is desired for one reason or another to confine or restrain the migration of reservoir fluids. One fact which makes the process of my invention practical is that many petroleum reservoirs contain substantial amounts of hydrogen sulfide which materially improves the economics of plugging off highly permeable zones or forming a barrier with free sulfur.

In practice the elemental sulfur is formed substantially at the location in the reservoir where the plug or pancake is desired, by injecting sulfur dioxide into the reservoir in the form of an aqueous solution or in any of several organic solvents such as the lower alcohols, acetone, hydrocarbons, etc. This solution of sulfur dioxide when forced back into the formation tends to form free sulfur when hydrogen sulfide is contacted. If the hydrogen sulfide is relatively concentrated, i.e., in amounts greater than 3 to 5%, in the gas phase and water is employed as the solvent, the reaction occurs at a relatively rapid rate. If an organic solvent is used and conditions are otherwise the same, the reaction is generally somewhat slower. This characteristic is useful when it is desired to secure plugging action a substantial distance away from the well and reaction of the sulfur dioxide is to be minimized until it reaches a desired remote location. From this point, a layer of free sulfur can be formed back toward the well. Premature or misdirected placement of a sulfur layer around the well may be avoided by first injecting a slug of alcohol or equivalent which is miscible both with oil and formation water, followed by a slug of lease oil or other suitable hydrocarbon. This tends to reduce water saturation and to drive away the hydrogen sulfide near the well bore and prevent plugging of the well bore face before the desired volumes of sulfur dioxide-containing fluids have been injected.

Figure 1:
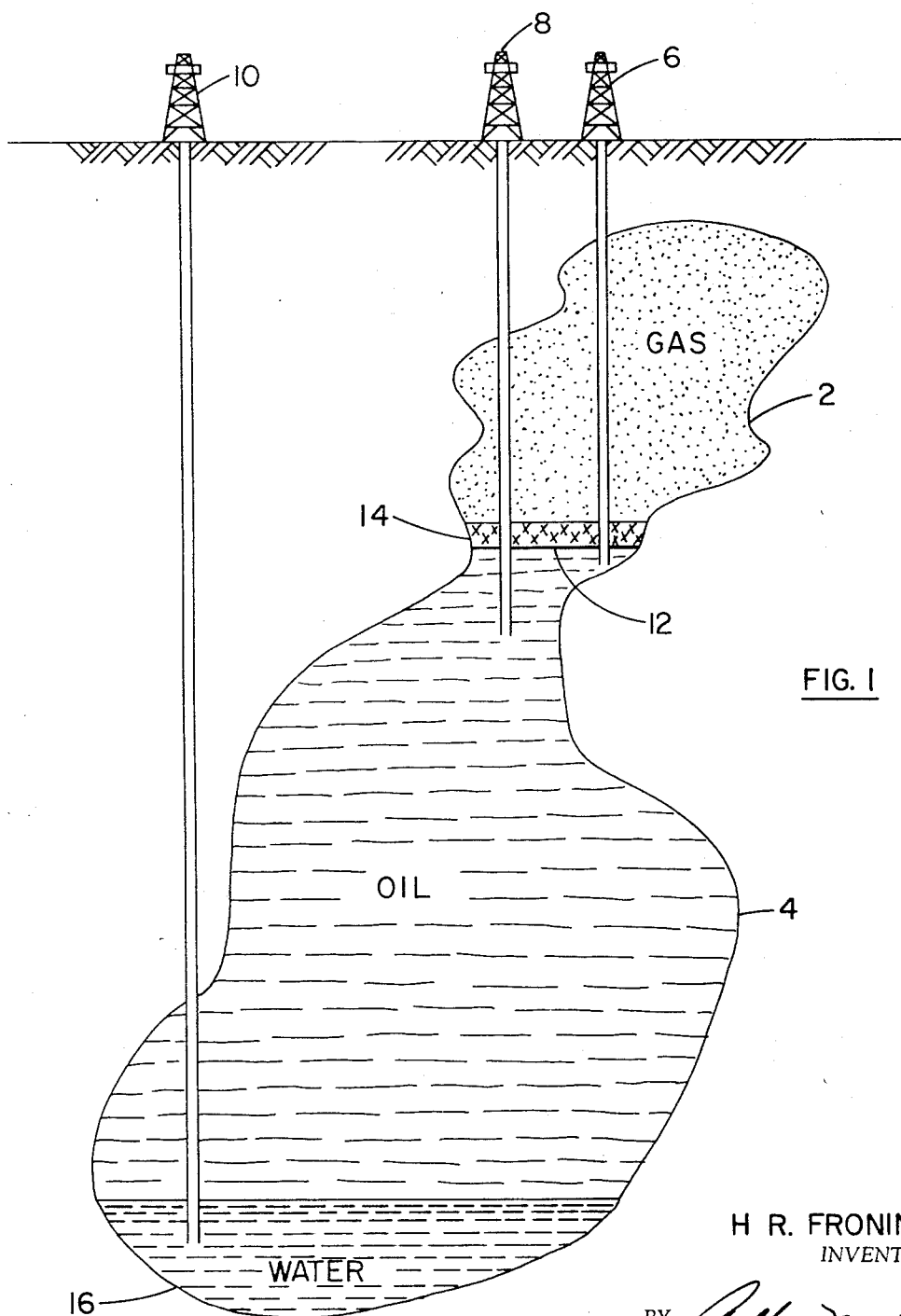
FIGURE 1 represents a cross-section of the earth showing the location of a petroleum deposit with a gas cap generally updip from the main body of oil sand.

Referring again to FIGURE 1, subterranean sour gas reservoir 2 is underlain by oil deposit 4 with wells 6, 8 and 10 penetrating said deposit. The field has reached the stage in its life where it has now become desirable to produce the oil by secondary recovery, e.g., waterflooding. In the course of primary production the pressure decreased substantially causing expansion of gas cap 2 into oil sand 4. Under ordinary circumstances, much energy would be expended in compressing gas cap 2 before sufficient energy could be imparted to the oil deposit for the oil to be produced at a practical rate. Accordingly, it becomes desirable to place a barrier or seal to prevent communication between the oil and gas phases at interface 12. This not only avoids having to compress the gas in cap 2 but also prevents migration of the oil into the area occupied by gas cap 2.

Placement of this seal overlying interface 12 is accomplished in the following manner. Wells 6 and 8 are perforated at or slightly above (or both) interface 12 with the wells having either bridge plugs or packers (not shown) in them and positioned so that fluids can be directed through the perforations into the gas cap. The gas in cap 2 has a hydrogen sulfide content of about 5% which is ample to promote a reasonably rapid reaction with sulfur dioxide in the presence of connate water and at a reservoir temperature of about 125° F. Before sulfur dioxide is injected, a slug of isopropyl alcohol corresponding to about 5 bbl. per foot of perforation interval is injected through the perforations in both wells 6 and 8 followed by a crude oil slug of comparable size. The purpose of this step is to provide an interval around the wells where sulfur will not be formed at least very fast on subsequent injection of sulfur dioxide. In some cases the water content of the formation may be sufficiently low to permit injection of sulfur dioxide without serious reduction in injectivity, resulting from sulfur formation about the well bore. Thereafter the sulfur doxide is injected into gas cap 2 via wells 6 and 8 at gas-oil interface 12. Knowing the porosity of the rock at interface 12 and the desired thickness and length of the barrier to be formed, the amount of sulfur dioxide required can be calculated. In this instance the sulfur dioxide is introduced in the form of a water solution with the sulfur dioxide being present in amounts sufficient to produce a saturated solution at atmospheric pressure. The quantity of such solution injected via each of wells 6 and 8 may vary with the distance over which sulfur layer 14 extends. It may be that more than two wells should penetrate interface 12 in order to obtain good distribution of the sulfur at the neck joining gas cap 2 with oil deposit 4. Generally, to effect a satisfactory seal, the volume of sulfur dioxide solution may vary from about 500 to 15,000 bbls. for each of the wells penetrating gas cap 2. Formation of sulfur barrier 14 begins within less than an hour after the sulfur dioxide is injected. Completion of the barrier may, however, require a period of several days. The average diameter of the sulfur barrier or pancake formed about a single well may range from about 100 to 350 feet. Thus while I have shown only two wells for use in the preparation of barrier 14, additional wells may be necessary depending on the width of interface 12.

When the barrier has been formed as evidenced by the buildup in pump pressure, water injection well 10 is placed in operation forming a bottom water layer 16 which provides the necessary energy for the production of oil from the reservoir via wells 6 and 8 without first having to compress the gas in cap 2.

The sulfur dioxide is injected in amounts sufficient to saturate the water in the region of the gas oil interface. Any of several methods may be used to accomplish this, depending on the reservoir properties, availability of sulfur compounds and the producing well location. For example, the sulfur dioxide may be injected in liquid slug form into off-set wells followed by a slug of produced oil. Connate water is normally present in sufficient quantity to promote formation of free sulfur when the hydrogen sulfide diffuses into the layer or bank of injected sulfur dioxide. Sulfur dioxide may be generated for use in my process by burning a natural gas rich in hydrogen sulfide or by burning free sulfur and thereafter injecting the gaseous products of combustion or a solution thereof into off-set wells or by combustion of the sour gas within the reservoir.

Where the sour gas in the reservoir is too dilute to permit a desirable reaction rate, the same procedure for pretreatment aound the injection well may be used as described above, followed by injection of sulfur dioxide. However, additional hydrogen sulfide should be injected so that formation of free sulfur to the proper extent can be realized within a reasonable time, e.g., a few days.

Figure 2:
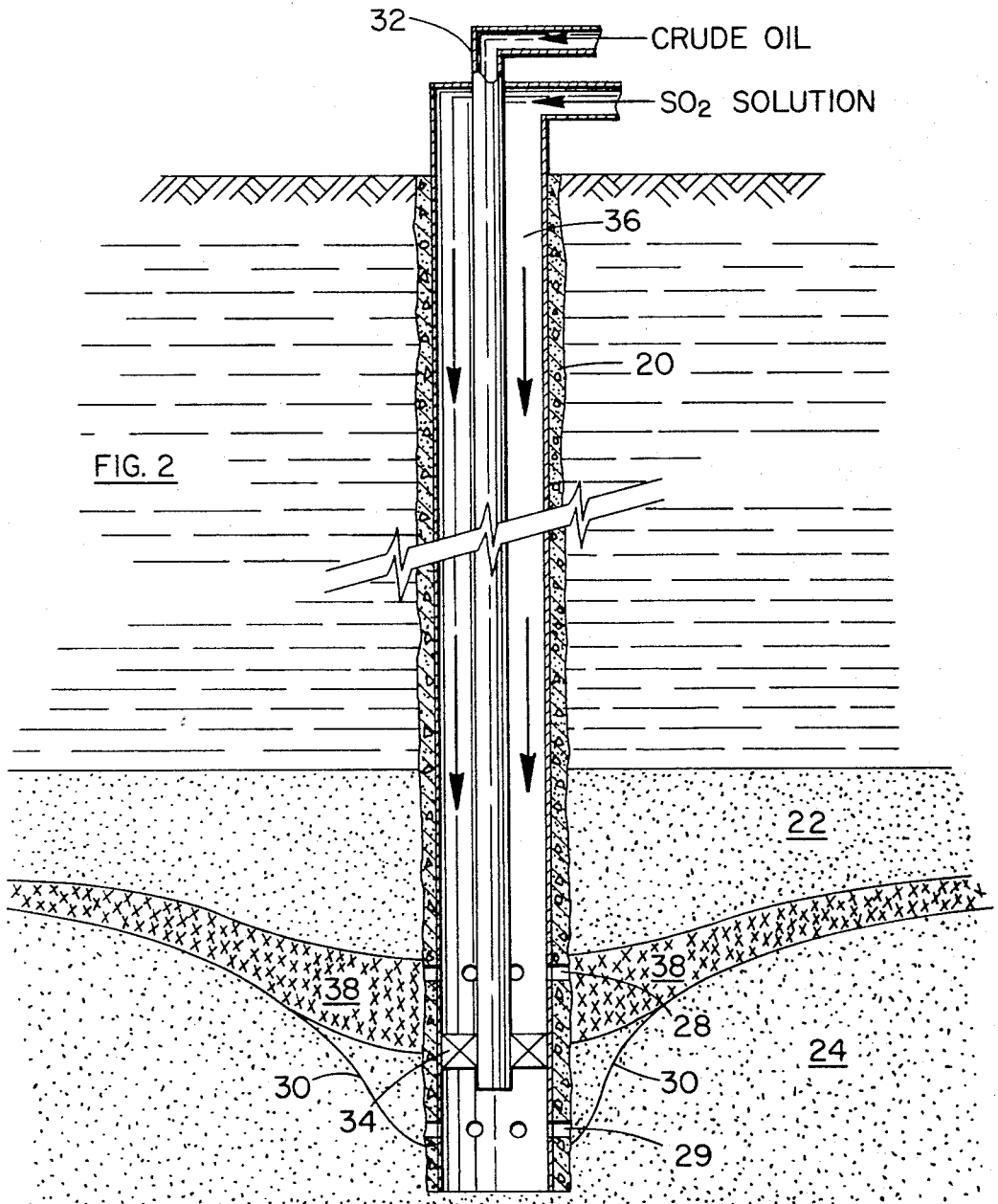
FIGURE 2 illustrates generally the phenomenon of gas coning around the well and how a layer of free sulfur can be laid down in accordance with my invention to overcome the problem.

FIGURE 2 is an illustration of the condition prevailing when an oil well goes off production owing to gas coning. In the initial producing life of well 20 the force components in gas sand 22 and in oil sand 24 are essentially equal, with the gas-oil interface in an essentially horizontal position. However, as oil is produced through perforations 28 the forces in the two layers become unbalanced and the gas-oil interface tends to assume the position shown by solid line 30. When this condition occurs, the flow of oil from sand 24 is essentially blocked, resulting in a high, e.g., 40,000 to 1, gas-oil ratio. At this time, a packer 34 is set on tubing 32 between the upper and lower sets of perforations 28 and 29, respectively, after which oil is injected into oil sand 24 via tubing 32 and perforations 29 while a solution of sulfur dioxide and water or a light, normally liquid hydrocarbon, e.g., straight run gasoline, is injected into gas sand 22 via annulus 36 and the upper set of perforations 28. One of the advantages of using a light hydrocarbon as a solvent for sulfur dioxide is that it avoids any problems that might be caused by gravity segregation and also no difficulties are encountered from the standpoint of water blockage. In fact, where the connate water content is unusually low, a small amount of water may be added to the sulfur dioxide solution in order to ensure the formation of free sulfur. Generally it is preferable to inject enough of the sulfur dioxide solution to extend for a distance of at least 50 feet from well 20. The approximate required volume of such solution can be readily determined by knowing the porosity of the formation where the sulfur layer is to be placed, the thickness of the proposed layer and the distance the layer extends away from well 20. Typically, this may amount to from about 50 to 500 bbls. per foot of perforated interval. The amount of oil injected just prior to and simultaneously with the sulfur dioxide solution but at a lower level in the well as mentioned above may generally be substantially equal or greater in volume to that of the sulfur dioxide solution injected. By injecting these two fluids simultaneously the sulfur dioxide solution tends to be more readily directed into the gas sand where the plugging or sealing action is desired. The simultaneous flow of oil through the lower set of perforations 29 aids in the prevention of the formation of free sulfur in undesirable locations and if the sulfur dioxide is introduced in the form of an aqueous solution will prevent the occurrence of water blockage in oil sand 24. Within a short period—generally a matter of a few hours—a layer or pancake 38 forms, effectively preventing further coning of the gas down into the oil sand. Additional hydrogen sulfide may penetrate into layer 38 resulting in the further formation of free sulfur and re-enforcing said layer between the gas and oil zones. It should be pointed out that although the simultaneous injection of crude oil into oil sand 24 along with the introduction of the sulfur dioxide solution into gas sand 22 is usually a preferred procedure, it is not essential in all cases for satisfactroy formation of sulfur layer 38, particularly where the sulfur dioxide is introduced in the form of an alcoholic or light hydrocarbon solution. Where perforations 28 are below gas-oil interface 26, additional perforations (not shown) should be made at about the level of said interface, packer 34 released and reset just below the newly made perforations and the sulfur dioxide solution supplied via annulus 36 to form sulfur layer 38 as previously described.

In view of the preceding description, it will be apparent that a number of variations can be made in the process of my invention without departing from the scope thereof. For example, both the hydrogen sulfide and sulfur dioxide may be supplied from external sources to form barriers or plugs as contemplated herein. In general, owing to economics, the situation where this approach is warranted will be limited. The exact procedure used will depend upon the intended use of the resulting sulfur layer, the reservoir characteristics, the volume of the reservoir to be treated and the availability and cost of sulfur compounds in the area.

I claim:

1. A method of selectively placing a plug or layer of free sulfur in a formation having a petroleum deposit and a sour gas cap lying up-dip from said petroleum deposit, said deposit being penetrated by at least one well, comprising forming a layer of sulfur at the gas-oil interface by injecting sulfur dioxide into said formation in the presence of moisture at approximately the level of said interface.

2. The method of claim 1 wherein on continued production of oil from said sand, gas pressure creates a gas cone around said well substantially preventing the flow of oil into said well and counteracting the effect of said cone by injecting sulfur dioxide into said deposit at a level above but near the gas-oil interface whereby the hydrogen sulfide present in said gas reacts with the injected sulfur dioxide in the presence of connate water to form a layer of free sulfur extending from said well to a point in said deposit remote from said well.

3. The method of claim 2 wherein the sulfur dioxide is injected into said deposit in the form of a solution, the solvent employed being an organic liquid.

4. The method of claim 2 wherein the solvent employed is a low molecular weight normally liquid hydrocarbon.

5. The method of claim 4 wherein the sulfur dioxide is injected in the form of an aqueous solution and a liquid hydrocarbon is simultaneously injected near said interface but below the level at which said solution is introduced whereby water blockage of the oil sand is prevented.

6. The method of claim 4 wherein the sulfur dioxide is introduced as a substantially saturated solution in an organic solvent miscible in oil as well as water.

7. The method of claim 6 wherein said organic solvent is a lower aliphatic alcohol.

8. The method of claim 1 wherein the oil is produced from said sand by means of a secondary recovery method.

9. The method of claim 8 wherein the secondary recovery method employed is a waterflooding operation.

10. The method of claim 1 wherein an initial slug of solvent miscible with both oil and water is injected via said well substantially at the gas-oil interface for a distance of at least about 10 feet from said well and this is followed by injecting a liquid hydrocarbon slug via said well at said interface prior to the introduction of sulfur dioxide.

11. A method of selectively placing a plug or layer of free sulfur in a formation containing a petroleum deposit having a gas zone in contact therewith, said deposit being penetrated by at least one well, and where on continued production of petroleum from said deposit gas pressure creates a gas cone around said well substantially preventing the flow of oil into said well, which comprises counteracting the effect of said cone by contacting sulfur dioxide with hydrogen sulfide in the presence of moisture substantially at the interface between said zone and said deposit to form a layer of free sulfur extending from said well to a point in said deposit remote from said well.

References Cited
UNITED STATES PATENTS

| | | | |
|---|---|---|---|
| 2,010,409 | 8/1935 | Muskat | 166—29 |
| 2,363,269 | 11/1944 | Schlumberger | 166—25 |
| 3,063,499 | 11/1962 | Allen | 166—42 |
| 3,123,140 | 3/1964 | Connally | 166—42 |
| 3,275,077 | 9/1966 | Smith et al. | 166—25 |
| 3,368,624 | 2/1968 | Heuer et al. | 166—29 |

STEPHEN J. NOVOSAD, *Primary Examiner.*

U.S. Cl. X.R.

166—300